Aug. 31, 1937.   G. HEIM   2,091,543
FEED DEVICE FOR BAKING OVENS
Filed Aug. 2, 1935
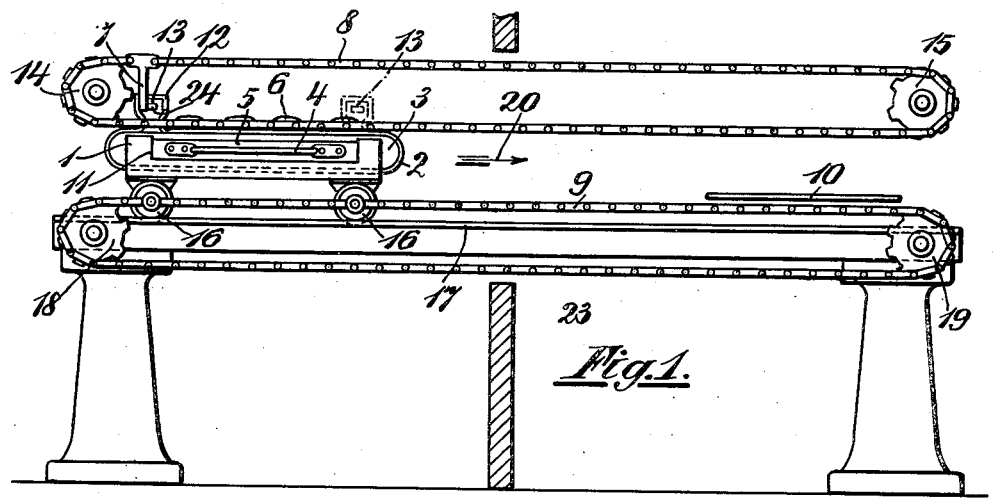
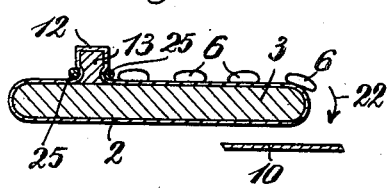
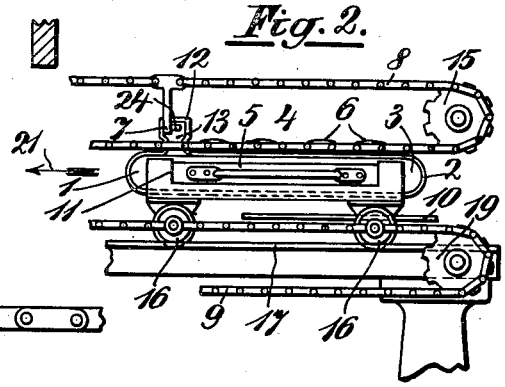
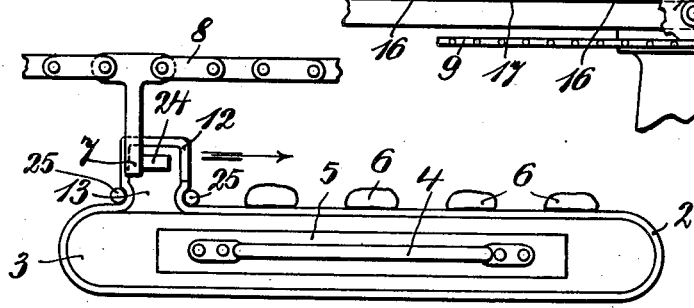
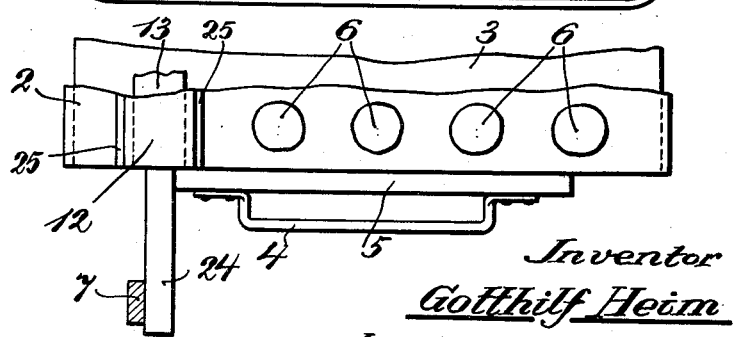
Inventor
Gotthilf Heim
by Karl Michaelis
Atty.

Patented Aug. 31, 1937

2,091,543

UNITED STATES PATENT OFFICE 2,091,543

FEED DEVICE FOR BAKING OVENS

Gotthilf Heim, Oberesslingen - on - the - Neckar, Germany

Application August 2, 1935, Serial No. 34,327
In Germany April 17, 1932

7 Claims. (Cl. 107—56)

My invention relates to devices for feeding pieces of dough to baking ovens. It has particular reference to feed devices of the kind in which the pieces of dough to be fed to the oven are placed on a feed plate surrounded by an endless web of fabric and are deposited on the baking plate by imparting to the feed plate movement away from the oven, while retaining the web, which is thus caused to glide on the feed plate and to allow the pieces of dough to drop onto the baking plate.

In feed devices of the kind mentioned above the ends of the web are held together by a gripping device linked to an endless chain or other conveyor. The feed plate runs on rollers and is also fixed to an endless chain or the like. In order to feed the dough to the oven, the feed plate with the pieces of dough placed thereon and the gripper gripping the ends of the web are moved by the chains towards the oven. The chain gears are then actuated in such manner that the gripper remains stationary, while the feed plate is moved in the reverse direction. Only after the pieces of dough have thus been deposited on the baking plate, the gripper is moved backwards also, its velocity being so chosen that the gripper and the feed plate reach their initial position simultaneously, in consequence of which the fresh pieces of dough are always placed on the same part of the web. Now the transporting of the pieces of dough from the fermenting boards onto the feed plate involves extra work and loss of time and since this transport must be effected very quickly, the pieces of dough are not deposited as a rule in the most favorable order. Apart therefrom, if the dough is still soft, the web will take up moisture and the pieces of dough will then stick to the web.

It is an object of my invention to provide a feed device of the kind aforesaid, in which all these drawbacks are avoided. In order to attain this, I render the feed plate independent from the conveyor chain by providing a slide or carriage connected with this chain and a number of exchangeable feed plates surrounded by endless webs, one of which is always deposited on the slide or carriage and held thereon against longitudinal movement. I am thus enabled to replace the fermenting boards by feed plates and thereby avoid the procedure of transporting the pieces of dough from the boards to the plates. I further render the plates independent also from the endless chain or the like which controls the web gripping device by mounting on the chain a member which cooperates with the web gripping device without being fixed to it.

I am thus enabled to operate the relative movement of the endless webs and feed plates in such manner that both sides of the web are utilized alternatingly.

I may even dispense with the upper endless chain altogether, leaving it to the attendant to hold the web gripping device in its position near the oven, while the feed plate is moved backwards by its endless chain.

In the drawing affixed to this specification and forming part thereof, a feed device embodying my invention is illustrated diagrammatically by way of example.

In the drawing

Fig. 1 is a vertical longitudinal section of the feed device and

Fig. 2 is a similar view of the feeding end of the device showing the parts in the position, where the pieces of dough are about to be deposited on the baking plate.

Fig. 3 is a side elevation, drawn to a larger scale, of a feed plate with its endless web and the member attached to the endless chain, which retains the web in its position, while the feed plate is moved backwards.

Fig. 4 is a partial plan view corresponding to Fig. 3;

Fig. 5 illustrates the process of depositing the pieces of dough on the baking plate.

Referring to the drawing, 17 is a track extending into the baking oven and 1 is a carriage with rollers 16 adapted to travel on this track. 3 is one of the feed plates, 4 are handles fixed to ledges 5 projecting from the sides of the plate. The side walls of the carriage are formed with indentures 11 into which project the ledges 5, which thus prevent the feed plate mounted on the carriage from moving longitudinally with respect to the carriage. 2 is the endless web of fabric surrounding the feed plate 3 and 12 is a fold in the web, through which extends a bar 13, the ends 24 of which project from the sides of the plate as shown in Fig. 4. Wires 25 serve to hold the loop 12 in engagement with the bar 13.

7 is an arm depending from the endless chain 8 running over sprockets 14, 15. The arm 7 projects downwardly into the path of the projecting ends 24 of the bar 13, as shown in Figs. 3 and 4. 9 is another endless chain traveling over sprockets 18, 19 and having the carriage 1 fixed to it so that whenever the chain moves in the direction of the arrow 20, the carriage is moved towards the baking plate 10 in the baking oven.

In the operation of this feeding device, after a fresh feed plate 3 carrying pieces of dough as shown in Figs. 3 and 4 has been mounted in place on the carriage 1 (Fig. 1), the chains 9 are moved in the direction of the arrow 20, whereby the carriage 3 with the feed plate mounted thereon is transported towards the baking plate 10, the arm 7 moving along with the plate. On the parts having reached the position shown in Fig. 2, the chain 9 is reversed, while the chain 8 remains immovable. Consequently the carriage 1 and the plate 2 mounted thereon are moved backwards relative to the arm 7, which projects into the way of the projecting ends 24 of the bar 13 extending across the endless web 2. This web being thus prevented from following the backward movement of the feed plate 3, this plate will glide under the bar 13 and the endless web 2 will glide on the plate 3, whereby the pieces 6 of dough resting on the web will be caused to drop down upon the plate 10 in the direction of the arrow 22 in Fig. 5. On this movement having come to an end, the chain is started on its return way, and this at a velocity such that the arm 7 recedes from the projecting ends 24 of the bar 13 and arrives at its initial position simultaneously with the carriage 1 and plate 3. The bar 13 now occupies the position, shown in dot and dash lines in Fig. 1, near the other end of the feed plate 3, the portion of the web, from which the pieces of dough were thrown off, now extending across the underside of the plate, while the fresh portion of the web is ready to receive fresh pieces of dough, which may be left to ferment on the plate, whereafter this latter is again mounted on the carriage, however with the loop 12 and bar 13 in the position shown in full lines in Fig. 1. In the meantime another feed plate carrying pieces of dough, which had already undergone fermentation, had been mounted on the carriage and conveyed to the oven.

Obviously the chain 8 and arm 7 may be dispensed with altogether, the projecting ends of the bar 13 being gripped and held in their position shown in Fig. 2 by an attendant, while the carriage and feed plate are moved in the direction of the arrow 21. In every case the feed plates being rendered independent of the carriage can now replace and render unnecessary the fermenting boards hitherto in use, whereby much time and labour is saved.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim in the present application to any modification not covered by these claims is expressly reserved.

I claim:—

1. Feed device for baking ovens comprising in combination, a feed plate, a support, means arranged for reciprocating movement along said support, a removable and reversible feed plate adapted to act as a fermenting board, mounted on said means an endless dough carrier sheet surrounding said plate and arranged to glide relative thereto and conveyor means disengageably connectible with said plate for conveying said plate towards and away from the charging end of the oven.

2. Feed device for baking ovens comprising in combination, a support, a carriage arranged for reciprocating movement along said support, a removable and reversible feed plate adapted to act as a fermenting board mounted in said carriage, a slide, means for conveying said slide towards and away from the charging end of the oven, an endless dough carrier sheet surrounding said plate and arranged to glide relative thereto, and means for disengageably coupling said plate with said slide.

3. Feed device for baking ovens comprising in combination, a slide, means for conveying said slide towards and away from the charging end of the oven, a feed plate, an endless dough carrier sheet surrounding said plate and arranged to glide relative thereto, projections on said plate and stops on said slide for disengageably coupling said plate with said slide.

4. Feed device for baking ovens comprising in combination, a slide, means for conveying said slide towards and away from the charging end of the oven, a feed plate, an endless dough carrier sheet surrounding said plate and arranged to glide relative thereto, means for disengageably coupling said plate with said slide, gripping means in the path of said plate for gripping said endless sheet and means for reciprocating said gripping means relative to the oven.

5. Feed device for baking ovens comprising in combination, a slide, means for conveying said slide towards and away from the charging end of the oven, a feed plate, an endless dough carrier sheet surrounding said plate and arranged to glide relative thereto, means for disengageably coupling said plate with said slide, gripping means in the path of said plate for gripping said endless sheet and means for reciprocating said gripping means relative to the oven and to said plate.

6. Feed device for baking ovens comprising in combination, a slide, means for conveying said slide towards and away from the charging end of the oven, a feed plate, an endless dough carrier sheet surrounding said plate and arranged to glide relative thereto, a sheet handling bar extending across said plate, a check in the way of said bar and means for reciprocating said check relative to the oven and to said plate.

7. Feed device for baking ovens comprising in combination, a track, a carriage on said track, an endless conveyor associated with said track to reciprocate said carriage thereon, a feed plate disengageably connectible with said carriage, an endless dough carrier sheet surrounding said plate and arranged to glide relative thereto, a sheet handling means projecting from said sheet, another endless conveyor above said first conveyor and means associated with said other conveyor for gripping said sheet handling means.

GOTTHILF HEIM.